United States Patent [19]
Kishi et al.

[11] Patent Number: 5,287,342
[45] Date of Patent: Feb. 15, 1994

[54] APPARATUS AND METHOD FOR REPRODUCING INFORMATION

[75] Inventors: Etsuro Kishi, Kawasaki; Ryo Kuroda, Machida; Takahiro Oguchi, Atsugi; Akihko Yamano, Yokohama; Toshihiko Miyazaki, Hiratsuka, all of Japan

[73] Assignee: Canon Kabushiki Kaisha, Tokyo, Japan

[21] Appl. No.: 818,159

[22] Filed: Jan. 8, 1992

[30] Foreign Application Priority Data

Oct. 4, 1991 [JP] Japan .................. 3-283792

[51] Int. Cl.$^5$ ............................. G11B 9/00
[52] U.S. Cl. .................. 369/126; 369/101; 365/151
[58] Field of Search ............ 369/126, 101; 365/151; 250/306, 302

[56] References Cited

U.S. PATENT DOCUMENTS

| | | | |
|---|---|---|---|
| 4,481,616 | 11/1984 | Matey | 369/126 |
| 4,489,278 | 12/1984 | Sawazaki | 369/126 |
| 4,829,507 | 5/1989 | Kazan et al. | 369/126 |
| 5,091,880 | 2/1992 | Isono et al. | 369/126 |
| 5,144,581 | 9/1992 | Toda et al. | 369/126 |
| 5,161,149 | 11/1992 | Potember et al. | 369/126 |

OTHER PUBLICATIONS

"Imaging of silver and copper tetracyanoquinodimethane salts using scanning tunneling microscope and an atomic force microscope" by S. Yamaguchi et al. Journal of Vaccuum Science & Technology B Second Series, vol. 9, No. 2 Part II, Mar./Apr. 1991 pp. 1129-1135.

"Molecular Rectifiers" by A. Aviram et al. Chemical Physics Letters Nov. 15, 1974, vol. 29, No. 2 pp. 277-283.

Primary Examiner—Paul M. Dzierzynski
Assistant Examiner—Kiet T. Nguyen
Attorney, Agent, or Firm—Fitzpatrick, Cella, Harper & Scinto

[57] ABSTRACT

An information reproducing apparatus includes a recording medium and a reproducing probe, and reproduces information from a signal between the recording medium and the probe. The apparatus further includes a unit for obtaining reproduced information from each of a plurality of data unit areas of the recording medium under different conditions. By obtaining a plurality of different kinds of information from scanning each recording region under the different conditions in a reproducing operation, it is possible to perform correction by discriminating a change in a tunnel current reflecting a recording bit from a tunnel current caused by projections and recesses of the surface and to remove a resulting error.

10 Claims, 7 Drawing Sheets

APPARATUS AND METHOD FOR REPRODUCING INFORMATION

BACKGROUND OF THE INVENTION

1. Field of the Invention

This invention relates to reproduction of information, and more particularly, to a recording/reproducing apparatus which records/reproduces information using a tunnel current flowing between a needle-like electrode and a recording medium having a memory effect while the electrode moves relative to the recording medium.

2. Description of the Prior Art

Recently, scanning tunnel microscopes (hereinafter termed STM's) which can directly observe the electronic structure of atoms in the surface of a conductor have been developed. The STM is expected to be used for a wide range of applications since it can measure a high-resolution real-space image of either a single-crystal sample or a non-crystalline sample, observe the sample with low electric power with little or no damage to the sample due to current, operate in the air, and can be used for various kinds of materials.

The STM utilizes a phenomenon that a tunnel current is generated if a metal probe is brought close to a conductive sample to a distance of about 1 nm (nanometer) while applying a voltage between the probe and the sample. This current is very sensitive to a change in the distance between the probe and the sample. Hence, by monitoring the tunnel current which changes when the probe scans the sample while maintaining the height of the probe constant, or by monitoring the amount of feedback for scanning with feedback control of the height of the probe so as to maintain the tunnel current constant, it is possible to depict the real-space structure of the surface of the sample, and also read various kinds of information relating to the total electronic cloud of electrons at the surface. Accordingly, it becomes entirely possible to perform a high-density recording/reproducing operation of the order as small as atomic order by applying the principle of the STM.

Recording/reproducing methods using this principle are roughly divided into two kinds. In one method, the physical shape of a surface is changed. In an apparatus using this method, physical projections and recesses are formed on the surface of a recording medium by physical deformation by a probe, fusion by a high-energy beam, such as a laser light beam, an electron beam or the like, adhesion of fine particles, or the like. In another method, an apparatus utilizes a reversible change in the electronic state of a surface or its neighborhood without changing the physical shape of the surface. The apparatus using the second method of changing the electronic state is advantageous for practical use from the viewpoint of recording density and the posibility of erasing and rewriting operations.

For example, a system has been known wherein an insulating or semi-insulating thin-film structure is provided on a substrate electrode, and recording/reproducing operation is performed using this thin-film structure, i.e., a fine structure capable of storing electric charges, such as an interface between laminated layers of a silicon oxide film and a silicon nitride film formed on a silicon substrate, or the like. Another system has been known wherein recording/reproducing operation is performed in an organic molecular film formed on an electrode, as described, for example, in a report (Journal of Vacuum Science & Technology, B9 (2), p. 1129, 1990) relating to coppertetracyanoquinodimethane (Cu-TCNQ) charge-transfer complexes by R. S. Potember of John Hopkins Univ., or in a report (Chemical Physics Letters, vol. 29, p. 277, 1988) relating to hemiquinones having a double-well potential structure of protons by A. Aviram et al of IBM.

FIGS. 7(a) and 7(b) show the principle of a recording/reproducing apparatus which uses one of the above-described recording mediums. As shown in FIG. 7(a), when a probe t scans the surface of a recording layer 2 formed on a substrate 1 while maintaining a constant height, and a voltage V having at least a predetermined threshold value is selectively applied between the probe t and the substrate 1 for respective data unit areas, a tunnel current having a barrier due to a gap between the probe t and the substrate 1 and the recording layer 2, or a gap between the probe t and the recording layer 2 is generated to form on-state bits, and binary information as shown in FIG. 7(b) is recorded.

In a reproducing operation, a tunnel current reflecting the electronic state of respective data unit areas can be read by sequentially applying a voltage less than the above-described predetermined threshold value between the probe t and the substrate 1 while scanning the surface of the recording layer 2 by the probe 1. It is also possible to reflect recorded information in the amount of feedback of the probe t in a tunnel current constant mode.

The above-described conventional approach, however, postulates an ideal state wherein no physical undulation influencing the tunnel current is present on the surface of the recording medium. If projections and recesses are actually present on the surface, a change in the tunnel current due to the projections and recesses cannot be discriminated from a change in the tunnel current reflecting recorded bits, thereby substantially increasing the error rate in a reproducing operation. The tunnel current changes exponentially in accordance with the distance between the probe t and the recording layer 2. For example, if projections and recesses of 1 angstrom are present, the value of the tunnel current changes in the range of 1 digit. Hence, even if a change in current due to a change in the electronic state of recorded bits is in the range of 3 digits, the permissible undulation of the surface is a few angstroms at most.

If the spatial frequency of projections and recesses is much larger or smaller than the frequency of the recording unit areas, it is possible to electrically separate signals. Accordingly, attention must be directed to an undulation which has projections and recesses having the same spatial frequency zone as the data unit area and which may cause a change in tunnel current of the same degree as a change in tunnel current due to the recording bits. For example, as shown in FIG. 8(a), if there exist a projection at a data unit region d3 and a recess at a data unit region d7, an off-state signal may be erroneously read as an on-state signal, and an on-state signal may be erroneously read as an off-state signal, as shown in FIG. 8(b).

In order to solve the above-described problem, it is possible to scan the surface in advance and record the state of a microscopic undulation of the surface to compensate for the influence of the microscopic undulation. This approach, however, is not practical, though possible in principle, since the amount of initial information relating to the state of undulation of data unit areas is very large, and an auxiliary storage corresponding to at least the total capacity of a storage medium is needed.

As another approach, a method of reading a modulated signal with respect to either the applied bias voltage or the distance between the probe t and the substrate 1 may also be considered. Since, in principle, the modulated value with respect to the bias voltage or the distance reflects in some cases only a particular change in the electronic state or the work function of the surface, a reproducing operation not influenced by an undulation may be performed.

It is difficult, however, to obtain a material in which a large change is produced in the above-described modulated signal by a change in recording bits. Furthermore, superposition of small noise due to thermal drift, external oscillation and the like is inevitable, greatly influencing the modulated signal. Hence, in order to obtain a measurable S/N ratio, an extremely-low-temperature and a highly anti-vibration environment is needed.

SUMMARY OF THE INVENTION

It is an object of the present invention to provide an information reproducing apparatus which solves the above-described problems, and which can perform a correct reading/reproducing operation even if projections and recesses are present on the surface of a recording medium.

The invention is directed to apparatus for reproducing information on a recording medium in which a voltage is applied between a probe and the recording medium and information is obtained for each of a plurality of data unit areas of the recording medium.

The foregoing and other objects are accomplished, according to one aspect of the present invention, by an information reproducing apparatus including a recording medium and a reproducing probe for reproducing information from a signal between the recording medium and the reproducing probe, and further including apparatus for obtaining reproduced information under a plurality of conditions for each data unit area of the recording medium.

By obtaining a plurality of different kinds of information by scanning each recording region under the plurality of conditions in a reproducing operation, it becomes possible to perform correction by discriminating a change in a tunnel current reflecting a recording bit from a tunnel current caused by projections and recesses of the surface so as to remove an error signal.

DETAILED DESCRIPTION OF THE PREFERRED EMBODIMENTS

Embodiments of the present invention will now be explained in detail with reference to FIGS. 1(a)–6(d).

Figure 1A:
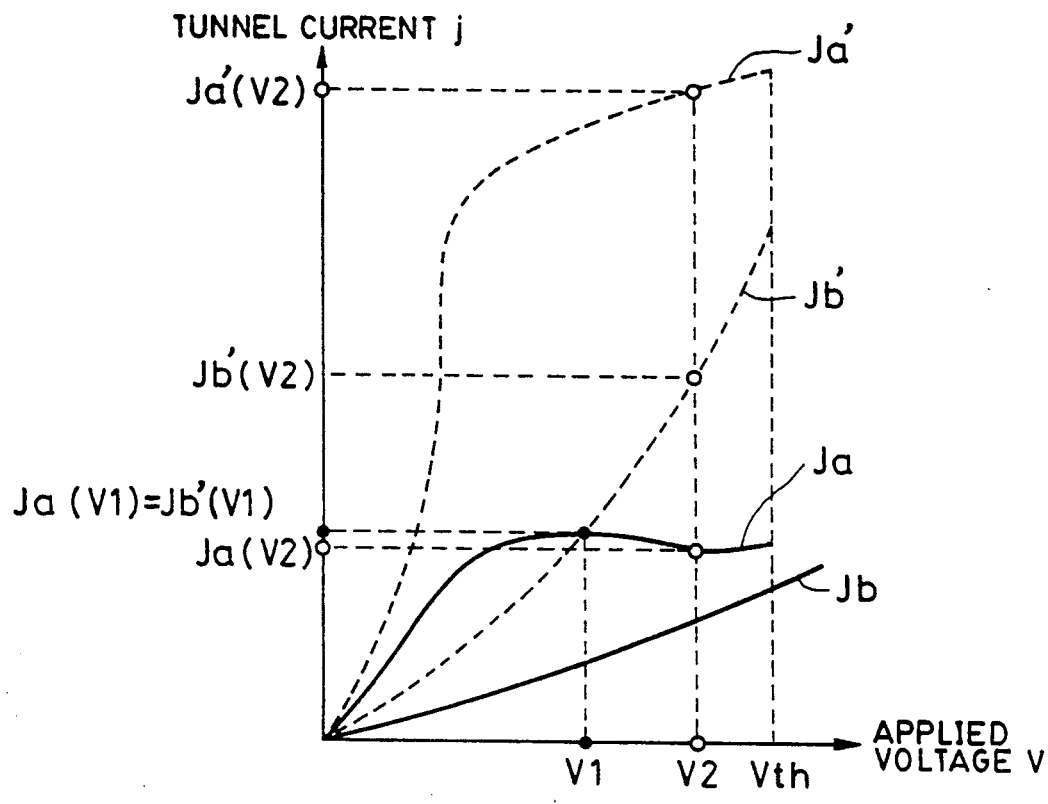
FIGS. 1(a) and 1(b) are graphs showing current-voltage characteristics and differential current-voltage characteristics of a recording-medium material used in an embodiment of the present invention, respectively.
Figure 1B:
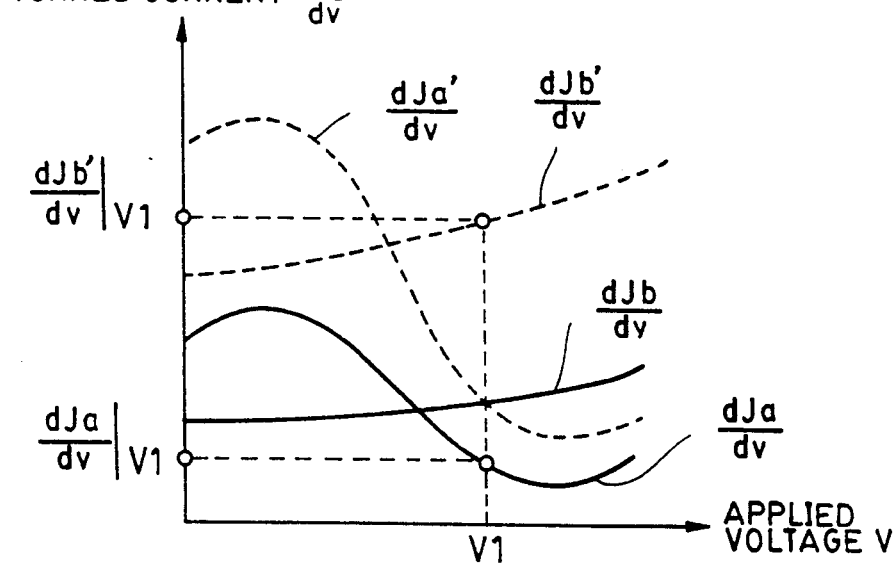
Figure 3:
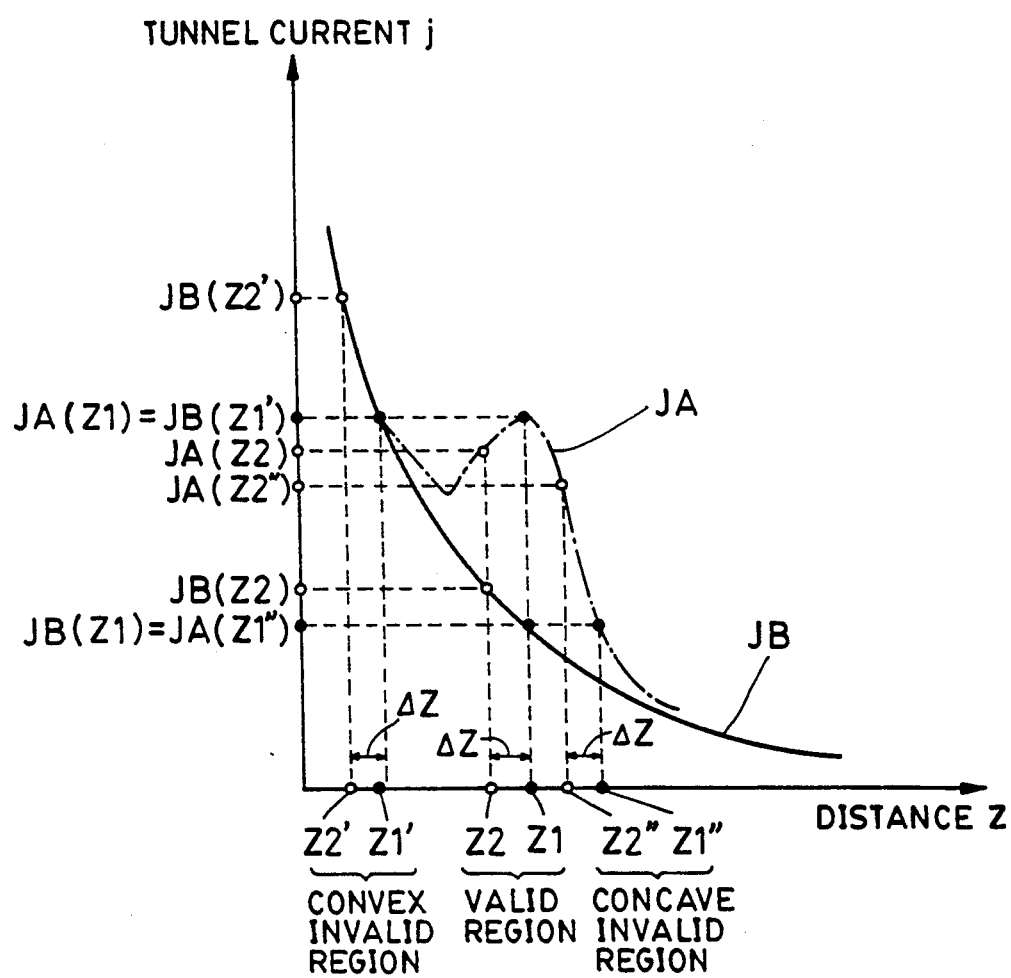
FIG. 3 is a graph showing the relationship between tunnel current and the distance between a probe and the recording-medium material shown in FIGS. 1(a) and 1(b)

In the present invention, in order to discriminate characteristics of a tunnel-current peculiar to a recording-medium material reflecting a change in the electronic structure or state of the surface of the material from characteristics of a tunnel current merely reflecting a distance between a probe and a substrate in applied voltage-tunnel current characteristics of a recording medium shown in FIGS. 1(a) and 1(b), or from the distance between the probe and the recording medium vs tunnel current characteristics shown in FIG. 3, a plurality of reproduced information relating to at least one measuring condition, such as the absolute value or the polarity of the applied voltage, the distance between the probe and the recording medium, or the like, is obtained so as to be able to compare the values of tunnel currents at at least two different points on the characteristic curves. Alternatively, the value of a tunnel current at one point on a characteristic curve, and its modulated value with respect to the applied voltage or the distance between the probe and the recording medium may be provided as information.

Figure 4A:
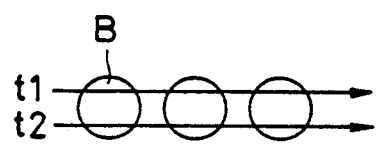
FIGS. 4(a) and 4(b) are diagrams illustrating the principle of the present invention.
Figure 4B:
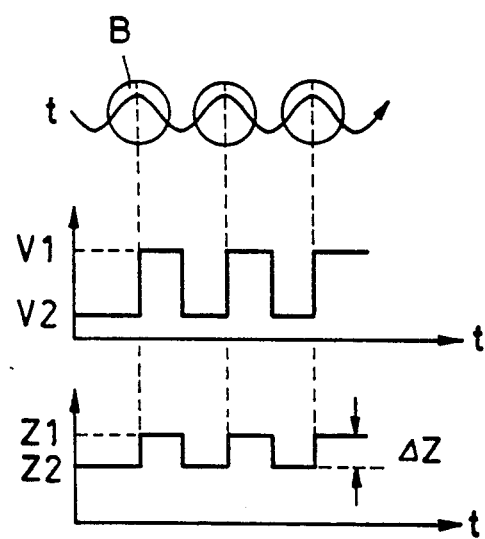

For that purpose, in the present invention, there is provided apparatus for reading a plurality of information from each data unit area. In one approach, as shown in FIG. 4(a), different measuring conditions are set for two probes t1 and t2 approaching an area less than the size of a data unit area, and data unit area B is simultaneously scanned by the probes t1 and t2. In another approach, as shown in FIG. 4(b), the time for scanning a data unit area by a single probe t is divided into two parts, and information is reproduced under different measuring conditions for a first half time and a second half time. In order to maintain the effective measuring distance per condition, the probe t wobbles in a direction perpendicular to the scanning direction. In still another approach, an apparatus which sweeps a single probe or a plurality of probes a plurality of times for every data unit area string or a recording unit area block may be considered. In this case, a sub-memory corresponding to the size of the block is needed.

Figure 5A:
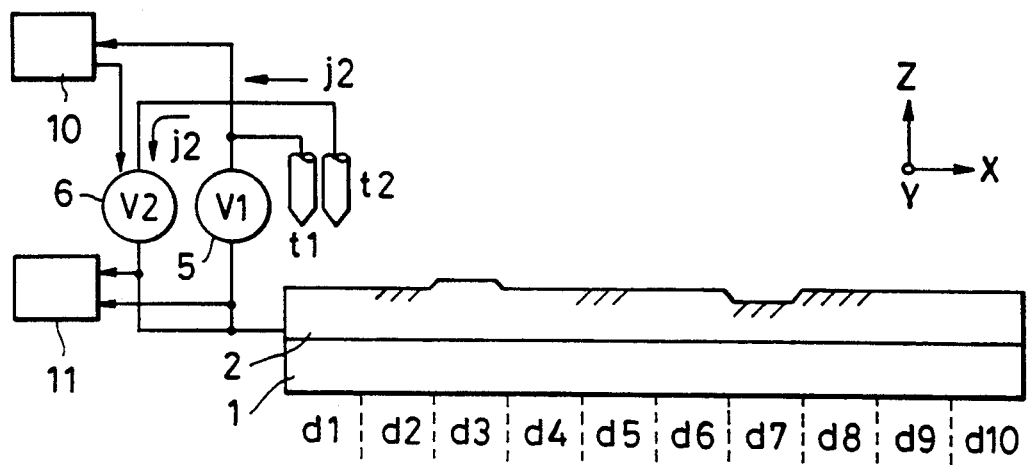
FIGS. 5(a)–5(d) are diagrams illustrating one embodiment of the present invention.
Figure 5B:
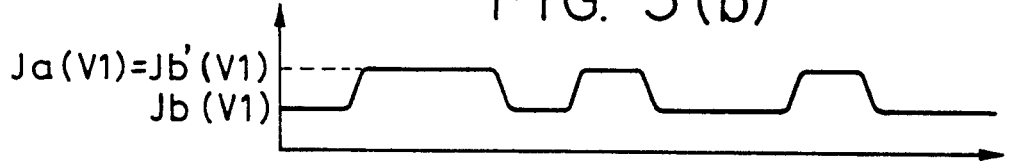

A recording medium according to a method of storing electric charges in an interface of insulators will now be specifically explained. In FIG. 5(a), a substrate 1 comprises a boron-doped p-type [100] silicon substrate. After being washed in $H_2SO_4$, the silicon substrate 1 is immersed in HCl to form a silicon dioxide ($SiO_2$) film to a thickness of 10–20 angstroms. Subsequently, a silicon nitride ($Si_3N_4$) film is deposited in vacuum to a thickness of 10–500 angstroms using an LPCVD (low-pressure chemical vapor deposition) method. Thus, a recording layer 2 comprising the silicon dioxide film and the silicon nitride film is obtained.

For the recording layer 2 thus formed, a bias voltage having at least a predetermined threshold value is applied between the substrate 1 and a probe so that the probe has a negative potential while maintaining the probe at a proper height. A tunnel current is thereby generated between the probe and the substrate 1. Part of the tunnel current is trapped in interface levels present in an interface between the silicon dioxide and the silicon nitride formed on the substrate 1, and remains as charges stored in the interface even after the bias voltage has been removed. Thus, information to be recorded is written.

FIG. 1(a) shows tunnel current-bias voltage characteristics before and after the charge storage. A bias voltage is applied so that the probe has a plus potential in contrast to the writing operation. Before the charge storage, the tunnel current Jb has characteristic Jb of increasing monotonically as the bias voltage increases. After the charge storage, a new channel is established due to non-elastic energy exchange between electrons stored in the interface and tunnel electrons. Hence, the tunnel current Ja at near the bias voltage corresponding to the energy of the interface trap levels increases.

Accordingly, by performing a reproducing operation near the above-described bias voltage, two stable states reflecting the presence and absence of stored charges can be read. By applying a voltage having at least the threshold value Vth, a tunnel current between the trap levels and the probe is generated, and trapped stored electrons are discharged to the probe as tunnel electrons, whereby the current characteristic returns to the characteristic Jb before the charge storage. Thus, there is provided a recording method wherein a memory effect is provided between two stable states and switching is performed between the two stable states by applying a voltage having at least the threshold value. A state wherein a current favorably flows is defined as an on-state, and a state wherein a current hardly flows is defined as an off-state.

In the present embodiment, in order to obtain information reproduced under a plurality of different conditions, as shown in FIG. 5(a), voltage application apparatus 5 and 6 apply different voltages V1 and V2 between two mutually-isolated probes t1 and t2 and a substrate electrode 2, respectively. Different kinds of information reproduced from the two probes t1 and t2 may be simultaneously obtained by arranging them in a direction orthogonal to the scanning direction so that the distance between them is shorter than the size of a data unit area, and reproduced information for respective unit areas may be compared via a differential circuit or the like.

The probes t1 and t2 can be formed using a micromechanical technique. That is, mutually-isolated conductive probe units having an interval of several to several tens of nanometers will be formed by implanting a focused ion beam of Si on a distal end of a cantilever-like substrate, made of $SiO_2$, $Si_3N_4$ or the like, having scanning in the X and Y directions, fine movement in the height of the Z direction, and a servo driving mechanism for selectively growing Si crystals on the substrate, and subsequently depositing Au in vacuum to perform conductive processing, or using an atomic-level micromanipulation technique utilizing the STM.

The operation of the present embodiment will now be explained. By performing a feedback control in the Z direction by a well-known feedback mechanism (not shown) for the component of a spatial frequency lower than the frequency of the size of the unit area on the surface of the recording layer 2, the probes t1 and t2 sequentially scan each unit area from a constant height. In a recording operation, the voltage application apparatus 5 applies the optimum voltage V1 for writing to the probe t1 in a region where the difference between the tunnel currents in the on-state and the off-state is large. While scanning respective data unit areas whose initial state is in the off-state, only data unit areas having a standard height and no projections and recesses where a standard tunnel current flows are selected as valid recording regions. The voltage application apparatus 6 applies the write pulse voltage V2 exceeding the threshold value to the probe t2 for the respective simultaneously-selected valid regions whenever necessary. Thus, digitized binary information is recorded by switching necessary regions. This control is performed by a control circuit 10. Data unit regions having projections and recesses whose spatial frequency is identical to the frequency of the data unit region and which therefore cannot be controlled by the feedback control in the Z direction are neglected as invalid regions, and information is not recorded in these regions.

When reproducing the information recorded in the above-described manner, it is necessary to reproduce information only from regions recognized as valid regions in the recording operation, and neglect information from regions excluded as invalid regions. Basically, information other than that estimated to be information reproduced from valid regions may be neglected. However, if the tunnel current in a valid region in the on-state equals the tunnel current in a convex invalid region in the off-state, the off-state of the convex invalid region may be in some cases misread as the on-state of the valid region, as shown in FIG. 5(d).

In the present embodiment, such a problem is solved by detecting another reproduced tunnel current J2 caused by another applied voltage by the probe t2. That is, in the current characteristics Ja and Jb for a valid region represented by solid lines and the current characteristics Ja' and Jb' for a convex invalid region represented by dashed lines shown in the current-voltage characteristic diagram of FIG. 1(a), a detected tunnel current Jb'(V1) of the convex invalid region in the off-state equals a detected tunnel current Ja(V1) in the off-state at a voltage V1 applied to the probe t1. However, if a voltage in a region where the difference between the current-voltage characteristic Ja(V2) in the on-state and the current-voltage characteristic Jb'(V2) can be extracted is selected as a voltage V2 to be applied to the probe t2, the two tunnel currents can be clearly discriminated.

Figure 5C:
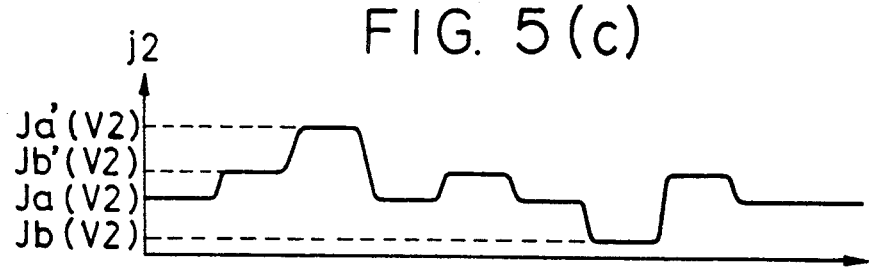

In this case, if the voltage V2 is selected within a region V1<V2<Vth, a relatively large difference can be extracted. The tunnel current J2 at that time is detected as shown in FIG. 5(c). Hence, it is possible to determine whether or not the target region is a valid region by checking a difference signal |J2−Ja(V2)| between the current value Ja(V2) expected in the on-state of a valid region at the voltage V2 and a detected signal J2.

Figure 5D:
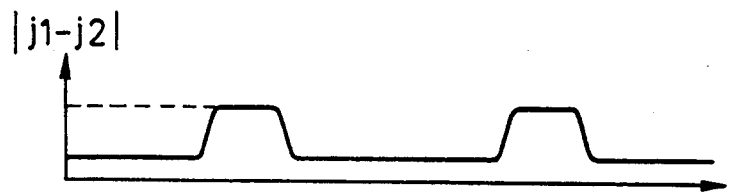

Alternatively, as shown in FIG. 5(d), an invalid region may also be extracted by detecting a difference signal |J1−J2| between the probes t1 and t2. In this case, it is possible to make |Ja(V1)−Ja(V2)|=0 by setting the voltages V1 and V2 to different values near the peak of the current in the on-state so that the difference between |Ja(V1)−Ja(V2)| and |Jb'(V1)−Jb'(V2)| is large. As a result, the difference between |Ja(V1)−Ja(V2)| and |Jb'(V1)−Jb'(V2)| can be easily extracted. The above-described processing is performed by a signal processing circuit 11. Signal reproducing processing is performed according to signals only from valid regions.

In the above-described embodiment, the two different probes t1 and t2 detect currents corresponding to the two different voltages V1 and V2 on the current-voltage characteristic curve shown in FIG. 1(a). As another approach, a detection current and a differential current with respect to the voltage at the voltage V1 may be compared as two different kinds of reproduced information. Also in this case, just as a valid region cannot be discriminated in some cases from an invalid region only by detection current signals, there necessarily exist cases wherein the two regions cannot be discriminated only by voltage-modulated components. In such cases, discrimination can be performed by comparing a current signal and its voltage-modulated component.

FIG. 1(b) shows differential current characteristics obtained from the current-voltage characteristics of FIG. 1(a). While detection currents are Ja(V1)≠Jb'(V1) at the voltage V1, differential components of the currents Ja and Jb' at the voltage V1 do not coincide. Hence, a valid region can be discriminated from an invalid region. Even if the differential currents coincide, the current values are Ja(V1)=Jb'(V1). Hence, discrimination can be performed. A composite detection signal obtained from the single probe t1 or t2 may be electrically decomposed using a low-pass filter or the like. Alternatively, the two probes t1 and t2 may be used.

Figure 6A:
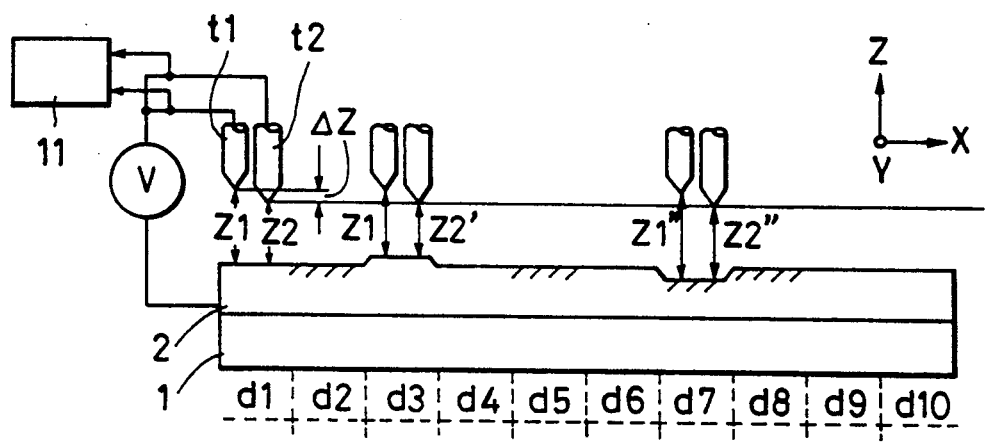
FIGS. 6(a)–6(d) are diagrams illustrating another embodiment of the present invention.

As still another approach, in order to obtain reproduced information under a plurality of different conditions, as shown in FIG. 6(a), a difference ΔZ is provided in the height of the distal ends of the two mutually-isolated probes t1 and t2 so that distances Z1 and Z2 to the recording layer 2 differ. FIG. 3 shows the relationship of the distance between the probe t and the recording layer 2, and the tunnel current j in the on-state JA and the off-state JB. In general, the tunnel current j increases exponentially as the distance decreases. It is known, however, that electrons stored in the interface of the isolated laminated layers function as a new tunnel current or perform energy exchange while elastically or inelastically interacting with tunnel currents at a specific distance between the probe t and the recording layer 2. That is, when a specific potential condition is satisfied, in the on-state, a peculiar peak characteristic is caused as represented by a curve JA shown in FIG. 3.

Figure 6B:
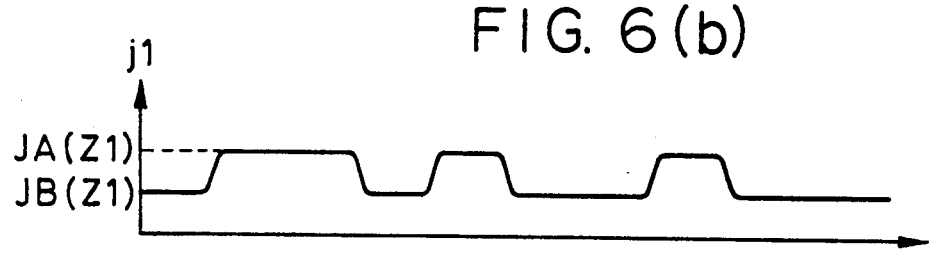
Figure 6C:
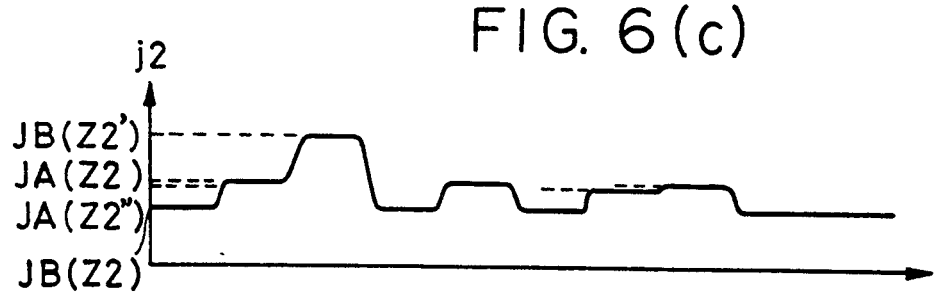
Figure 6D:
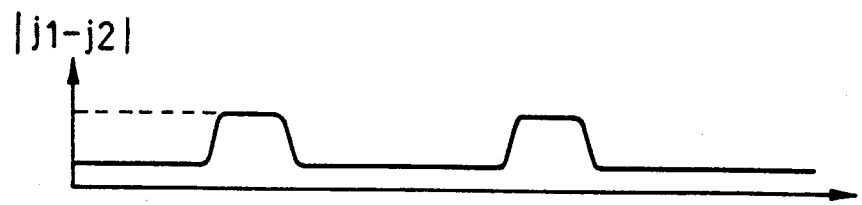
Figure 7A:
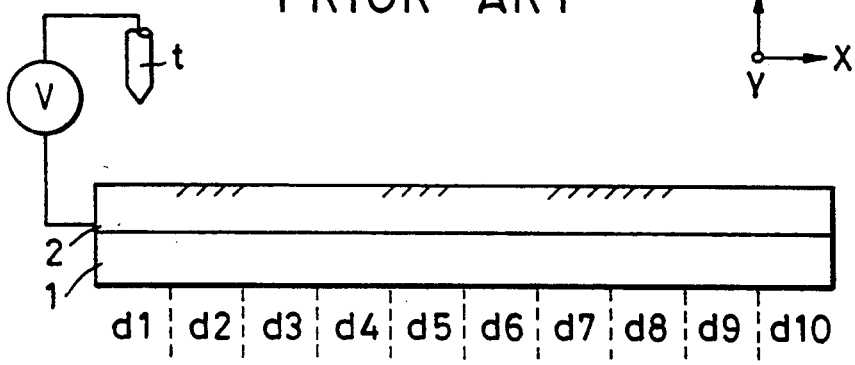
FIGS. 7(a) and 7(b) are diagrams illustrating a conventional approach.
Figure 7B:
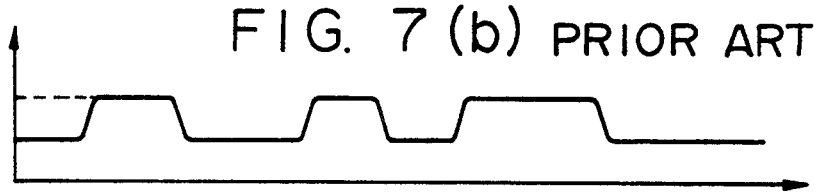
Figure 8A:
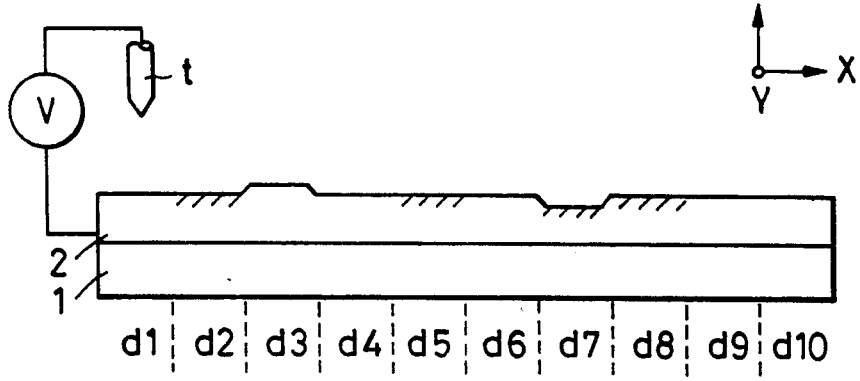
FIGS. 8(a) and 8(b) are diagrams illustrating a particular case in the conventional approach.
Figure 8B:
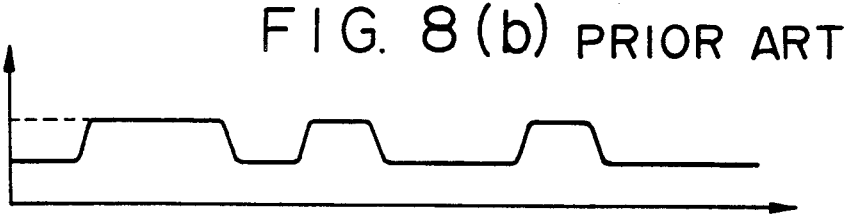

In the present embodiment, a difference between the on-state JA and the off-state JB is extracted by providing the difference ΔZ between the distances Z1 and Z2 from the probes t1 and t2, and the recording layer 2. That is, if only the probe t1 at the distance Z1 is used, as shown in FIG. 6(b), the detection current JA(Z1) from a valid region in the on-state equals in some cases the detection current JB(Z1') in a convex invalid region in the off-state, and therefore the two currents cannot be discriminated. On the other hand, by setting the distance Z2 of the probe t2 to Z2=Z1−ΔZ, a difference in characteristics can be extracted as shown in FIG. 6(c), and it is possible to determine whether or not the target region is a valid region by checking a difference signal |J2−JA(Z2)| between the detection signal J2 and the current value JA(Z2) expected for a valid region in the on-state at the distance Z2. That is, as shown in FIG. 6(d), an invalid region can be extracted by detecting the difference signal |J1−J2| between the probes t1 and t2.

Furthermore, discrimination may also be performed by comparing a detection current at the voltage V1 and its modulated component with respect to the distance Z as two different kinds of reproduced information in the same manner as in the above-described case of the modulated component with respect to the voltage V.

In the above-described information reproducing apparatus, it becomes possible to perform previously impossible discrimination between a signal to be detected and an undulation, that is, physical projections and recesses, on the surface of a recording medium whose spatial frequency is close to the spatial frequency of a data unit region of the recording medium, and therefore to greatly reduce the error rate.

Figure 2:
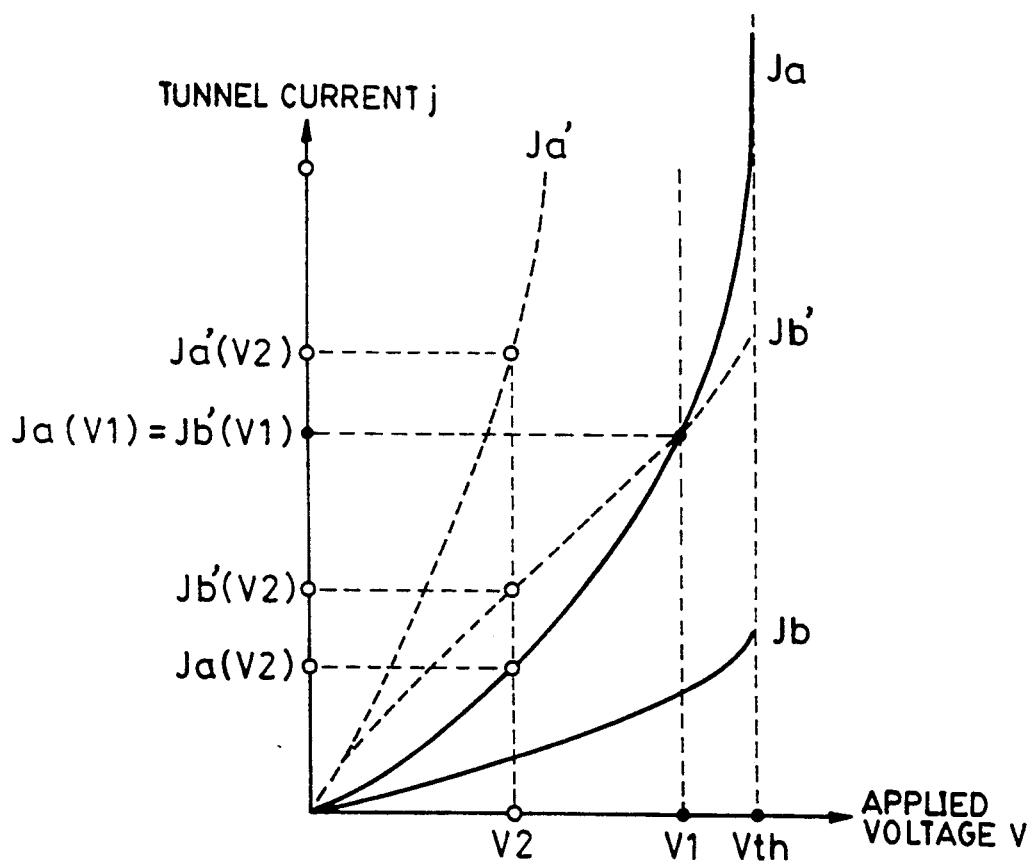
FIG. 2 is a graph showing current-voltage characteristics of a recording-medium material different from that shown in FIGS. 1(a) and 1(b)

While, in the above-described embodiments, an explanation has been provided of a charge-storage-type recording medium, the present invention is not limited to the current-voltage characteristics of the recording medium of this type. As another example, FIG. 2 shows current-voltage characteristics of the on-state current Ja and the off-state current Jb of a copper-tetracyanoquinodimethane (Cu-TCNQ) charge-transfer complex which is famous for having a switching phenomenon seen in an organic thin film. In the Cu-TCNQ charge-transfer complex, by applying a bias voltage having at least a threshold value Vth, the energy band structure changes in accordance with charge transfer between acceptor-like TCNQ molecules and Cu atoms, and switching can be performed between two metastable states. In a limited voltage region below the threshold value, the off-state current Jb has a nearly ohmic characteristic, and the on-state current Ja has a non-ohmic characteristic.

The object of the present invention may be achieved by setting the bias voltage V1 and V2 as shown in FIG. 2, and comparing reproduced information of tunnel currents at the two different bias voltages V1 and V2 in substantially same manner as in the above-described case of the charge-storage-type recording medium.

The invention has been described with respect to particular preferred embodiments thereof. It is to be understood, however, that various changes and modifications may be made by those skilled in the art without departing from the spirit and scope of the invention.

What is claimed is:

1. An apparatus for reproducing information recorded on a recording medium, comprising:
    a probe facing the recording medium said recording medium comprising a plurality of data unit areas;
    means for applying a voltage between the recording medium and the probe;
    means for obtaining a plurality of kinds of information from each of said plurality of data unit areas of the recording medium; and
    means for reproducing the information recorded on said recording medium corresponding to each of said plurality of kinds of information obtained,
    wherein said plurality of kinds of information are obtained under respective different conditions.

2. An apparatus according to claim 1, further comprising means for scanning the probe relative to the recording medium.

3. An apparatus according to claim 2, further comprising means for performing simultaneous or sequential scanning by a plurality of probes.

4. An apparatus according to claim 2, further comprising means for performing time shared scanning or a plurality of times of scanning by a single probe.

5. An apparatus according to claim 1, further comprising means for detecting a tunnel current flowing when the voltage is applied between the probe and the recording medium.

6. An apparatus according to claim 1, said means for reproducing the information recorded on said recording medium compares said plurality of kinds of information with each other, thereby reproducing real information which is distinguished from projections/recesses on the surface of said recording medium and recorded on said recording medium.

7. An apparatus according to claim 1, wherein said different conditions comprise at least one of the absolute values of voltages applied between said probe and said recording medium, the polarities of voltages, and the presence and absence of modulation with respect to the voltage.

8. An apparatus according to claim 1, wherein said different conditions comprise at least one of distance between said probe and said recording medium, and the presence and absence of modulation with respect to the distance.

9. An apparatus according to claim 1, wherein said means for obtaining the plurality of kinds of information includes means for electrically separating composite information obtained by a single probe when said plurality of kinds of information comprises information on presence/absence of voltage modulation or distance modulation.

10. A method for reproducing information recorded on a recording medium by using a probe, comprising the steps of:

applying a voltage between the recording medium having a plurality of data unit areas and the probe;

obtaining a plurality of kinds of information from each of said plurality of data unit areas of the recording medium; and reproducing the information recorded on the recording medium corresponding to each of the plurality of kinds of information obtained.

wherein said plurality of kinds of information are obtained under respective different conditions.

* * * * *

UNITED STATES PATENT AND TRADEMARK OFFICE
CERTIFICATE OF CORRECTION

PATENT NO. : 5,287,342
DATED : February 15, 1994
INVENTOR(S) : ETSURO KISHI ET AL.               Page 1 of 2

It is certified that error appears in the above-identified patent and that said Letters Patent is hereby corrected as shown below:

Title page, item [75]:

AT INVENTORS

"Akihko Yamano" should read --Akihiko Yamano--.

AT [56] REFERENCES CITED

Other Publications,

In "Imaging of Silver etc."
"B Second" should read --B, Second--,
"No. 2" should read --No. 2,-- and
"Mar./Apr. 1991" should read --Mar./Apr. 1991,--.

In "Molecular Rectifiers"
"No. 2" should read --No. 2,--.

COLUMN 1

Line 15, "STM's)" should read --STMs)--.

COLUMN 2

Line 1, "coppertetracyanoquinodimethane" should read --copper-tetracyanoquinodimethane--.

UNITED STATES PATENT AND TRADEMARK OFFICE
CERTIFICATE OF CORRECTION

PATENT NO. : 5,287,342
DATED : February 15, 1994
INVENTOR(S) : ETSURO KISHI ET AL.

It is certified that error appears in the above-identified patent and that said Letters Patent is hereby corrected as shown below:

COLUMN 9

Line 1, "claim 1, said" should read
--claim 1, wherein said--.

Signed and Sealed this

Twentieth Day of September, 1994

Attest:

BRUCE LEHMAN

Attesting Officer

Commissioner of Patents and Trademarks